United States Patent [19]

Cresap

[11] Patent Number: 4,668,874
[45] Date of Patent: May 26, 1987

[54] METHOD AND APPARATUS FOR DISABLING A STARTER

[76] Inventor: Elmer Cresap, 6828 SW. 12th Ave., Portland, Oreg. 97219

[21] Appl. No.: 787,454

[22] Filed: Oct. 15, 1985

[51] Int. Cl.$^4$ ............................................. B60R 25/00
[52] U.S. Cl. .................................. 307/10 AT; 180/287
[58] Field of Search ................... 307/10 AT; 180/287; 340/63; 290/38, 48

[56] References Cited

U.S. PATENT DOCUMENTS 4,410,775  10/1983  Howard ...................... 307/10 AT X
4,515,237   5/1985  Gonzalez et al. .......... 307/10 AT X
4,533,016   8/1985  Betton ....................... 307/10 AT X Primary Examiner—Benjamin Dobeck
Attorney, Agent, or Firm—Chernoff, Vilhauer, McClung & Stenzel

[57] ABSTRACT

A method and apparatus for disabling a starter motor interrupts the ground conduit within the starter motor casing, breaking electrical continuity between the commutator and ground, by physically displacing a portion of the ground conduit. A cable, attached to a switch within the starter motor casing extends out of the starter motor and into the cab of the vehicle.

7 Claims, 5 Drawing Figures

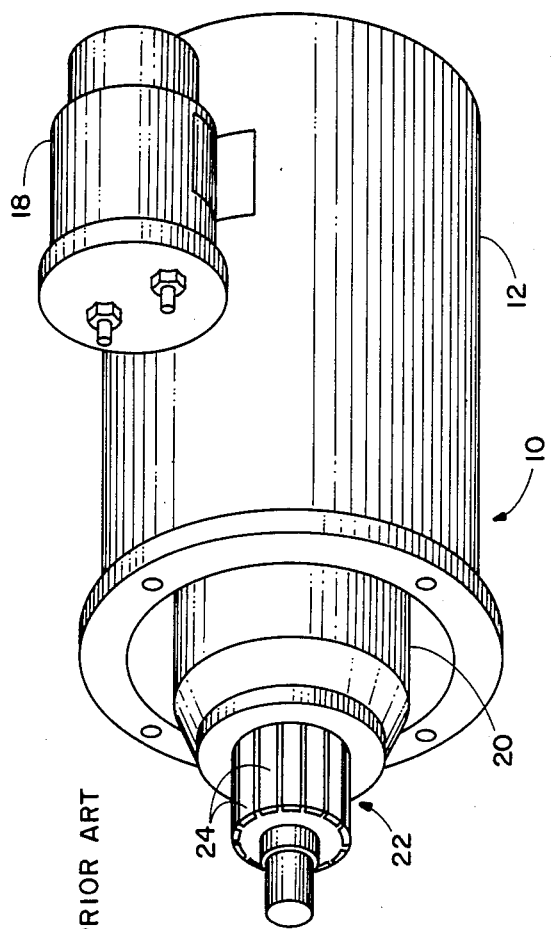
FIG. 1 PRIOR ART
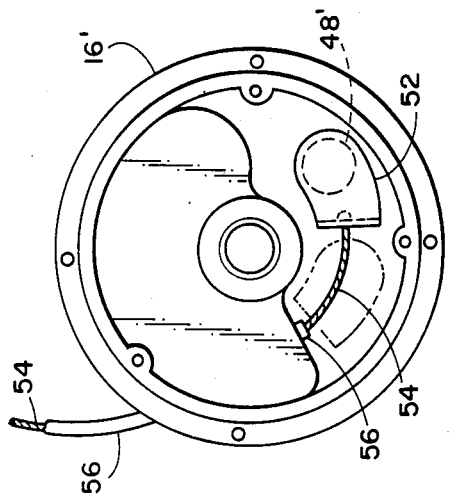
FIG. 3
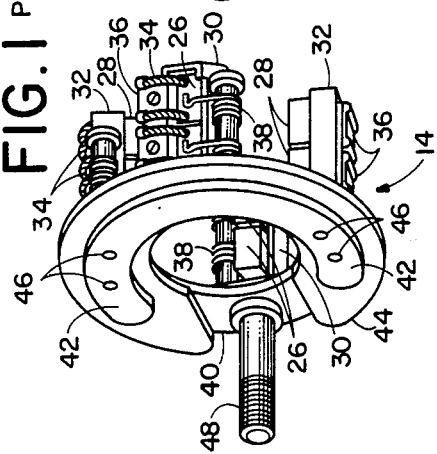
FIG. 2
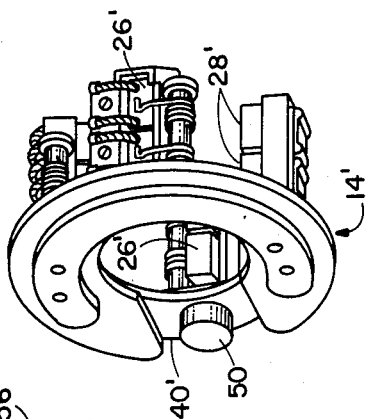
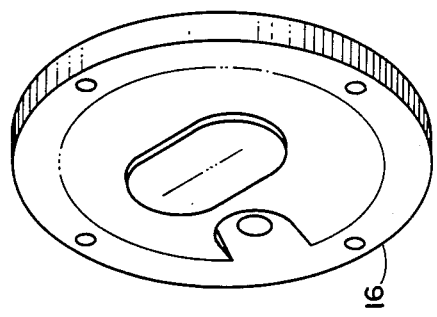
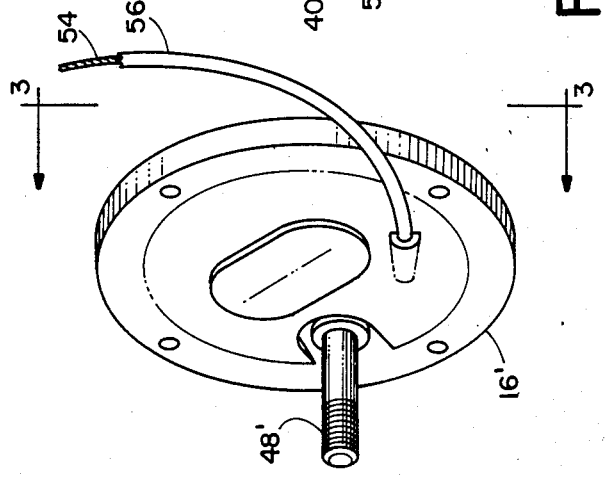

METHOD AND APPARATUS FOR DISABLING A STARTER

BACKGROUND OF THE INVENTION

This invention relates to a method and apparatus for disabling a starter motor and particularly to such a method and apparatus which will be difficult to diagnose and time-consuming to overcome.

Hijacking of vehicles such as armored trucks or trucks carrying valuable cargo has become commonplace. Also, the rise of terrorist activity throughout the world has emphasized the need to protect vehicles carrying sensitive material such as nuclear fuel or defense-related materials such as weapons from being hijacked by terrorists. Past practitioners in this area such as Theobald U.S. Pat. No. 3,851,504, Roby U.S. Pat. No. 3,738,444, Wilde U.S. Pat. No. 2,519,167, Roth U.S. Pat. No. 2,820,149, Karl U.S. Pat. No. 2,853,627 and Gardner U.S. Pat. No. 3,692,965 have devised a number of methods to prevent the unauthorized starting of a vehicle. Most of these methods involves switches or locks which are positioned physically or electrically between the ignition or the battery and the starter motor to prevent the starter motor from being energized. Consequently, it is a simple matter to trace the electrical circuit from the battery to the starter motor, locate the switch or lock, and disable or bypass it.

SUMMARY OF THE INVENTION

The present invention provides a novel method and apparatus for disabling a starter motor in a way which will be difficult to diagnose and time-consuming to overcome, by physically interrupting the ground circuit within the casing of the starter motor so that the starter motor will not operate to start the vehicle.

Starter motors typically have two or more ground brushes in electrical contact with conductive commutator bars which are electrically connected to the armature windings of the starter motor. A ground circuit or conduit electrically connects the ground brushes to a ground connection, usually a ground post or the starter motor casing which, in turn is grounded to the engine or vehicle frame. The exemplary embodiment of the present invention involves physically interrupting that portion of the ground conduit within the starter motor casing between the commutator and the ground connection by physically displacing a portion of the ground conduit out of electrical contact with the remainder of the ground conduit.

A displaceable conductive element or switch is interposed in the ground conduit and attached to a cable which passes through the end frame of the starter motor casing to the cab area of the vehicle. To disable the starter motor the vehicle operator can pull the cable, displacing a portion of the ground conduit within the starter motor casing and interrupting the electrical continuity between the commutator and ground.

Visual inspection and electrical testing of the energized leads to the starter motor will not reveal the disabling switch. Similarly, continuity testing of the vehicle's ground circuit from outside of the starter motor casing to ground will not reveal the switch. The only visible evidence of the device is the cable passing through the end frame of the starter motor casing which, when coated with grease, oil and dirt will merely appear to be another wire.

In order to start the vehicle, it is necessary to remove and replace the starter motor, or alternatively remove and dismantle the starter motor, reset the displaceable switch, and reassemble and replace the starter motor onto the vehicle. Hijackers, thieves and terrorists are unlikely to discover the device and to perform the necessary steps to overcome the device before being apprehended.

Accordingly, it is principal objective of the present invention to provide a method and apparatus for disabling a starter motor.

It is a further object of the present invention to provide such a method and apparatus which is difficult to detect.

It is a further objective of the present invention to provide such a method and apparatus which is time-consuming to overcome.

It is an associated objective of the present invention to provide such a method and apparatus which will not harm the vehicle or the starter motor.

It is a particular objective of the present invention to interrupt the ground circuit of a starter motor within the casing of the starter motor.

The foregoing and other objectives, features, and advantages of the invention will be more readily understood upon consideration of the following detailed description of the invention, taken in conjunction with the accompanying drawings.

BRIEF DESCRIPTION OF THE DRAWINGS

FIG. 1 is an exploded view of a prior art type of starter motor.

FIG. 2 is a partial exploded view of the exemplary embodiment of the present invention showing an end frame and brush holder assembly according to the present invention.

FIG. 3 is a view of the end frame of FIG. 2 taken along lines 3—3 of FIG. 2.

DETAILED DESCRIPTION OF THE INVENTION

Figure 4:
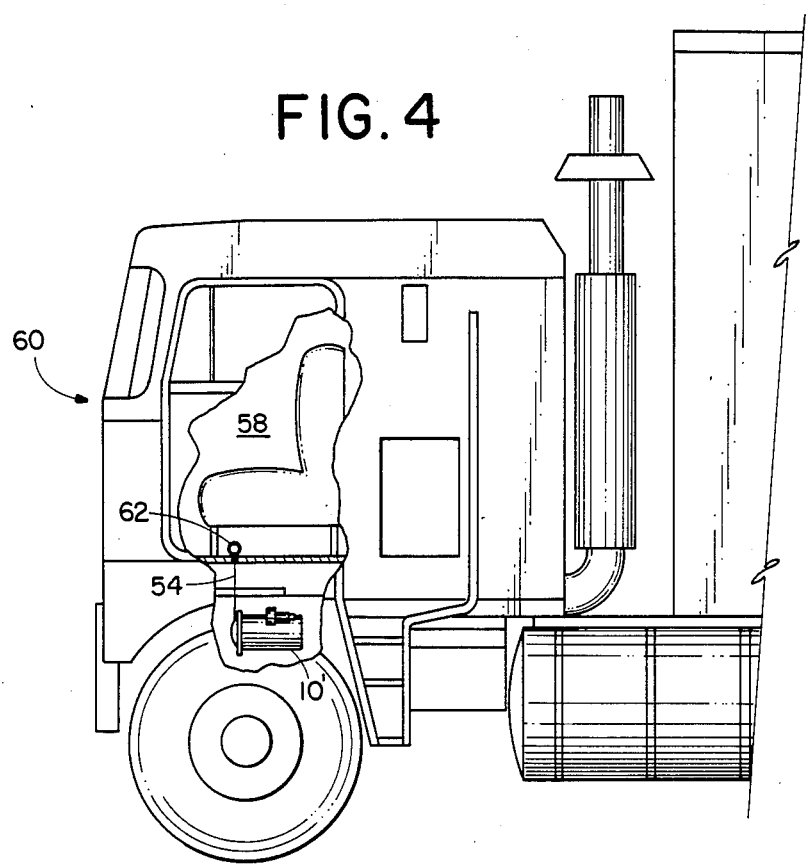
FIG. 4 is a partially cutaway view of a truck cab showing the starter motor and activation cable.

FIG. 1 is an exploded view of a typical starter motor 10 for a large truck showing the main portion of the starter motor within its casing 12, the brush holder assembly 14 and the end frame 16 of the starter motor casing. The main portion of the starter motor includes a solenoid 18 attached to the starter motor casing, an armature 20 including a number of windings, and a commutator 22 having a plurality of conductive commutator bars 24 insulated from one another.

The brush holder assembly includes a plurality of brushes, ground brushes 26 and hot brushes 28, arranged in like pairs, each pair of ground brushes mounted in one of a pair of ground brush holders 30, and each pair of hot brushes mounted in one of a pair of hot brush holders 32. Both the hot brushes and the ground brushes are electrically connected to their respective conductive brush holders by copper brush wires 34 leading to brackets 36 which are fastened to the respective brush holders. Springs 38 mounted on the brush holders are employed to urge the brushes against the commutator to ensure good electrical contact between the commutator bars and the brushes.

In the typical brush holder assembly shown in FIG. 1, four brush holders, each brush holder holding two brushes of the same type, are arranged around the commutator, the two ground brush holders arranged opposite each other and next to hot brush holders. The two ground brush holders 30 are supported upon and in electrical contact with a conductive, circular, ground brush support plate 40. The hot brush holders 32 are supported by and in electrical contact with a conductive hot brush strap 42 through connecting studs 46. An insulating plate 44 is sandwiched between and insulates the ground brush support plate from the hot brush strap. Additional insulators, not shown, are interposed between the hot brush holders and the ground brush support plate. The connecting studs 46 extend through the insulating plate and the ground brush support plate to physically and electrically connect the hot brush holders to the common hot brush strap. A conductive ground post 48 is physically and electrically connected to the ground brush support plate.

When the starter motor of FIG. 1 is assembled, the ground post 48 extends through the end frame 16 and provides a ground connection point for the starter motor. In starter motors of the type shown in FIG. 1, the ground post is usually electrically connected to the vehicle engine or frame by a heavy wire lead. Other types of starter motors use the starter motor casing as the exterior ground connection point and ground the casing of the starter motor by the mounting bolts which mount it to the engine.

When the hot brushes and field coils, not shown, of the starter motor are energized by electrical current from the battery, the armature and commutator of the starter motor turn, cranking the engine. The ground brushes, ground brush wires, brackets, ground brush holders, ground brush support plate and ground post provide a ground conduit to complete the circuit and enable the starter motor to operate. Note that all of the components of the ground conduit discussed above, except for the ground post, are within the confines of the starter motor casing, and are not accessible when the starter motor is assembled.

Turning to FIG. 2, a brush holder assembly 14' and end frame 16' which have been modified according to the exemplary embodiment of the present invention are shown. The ground post 48' has been physically disassociated from the brush holder assembly 14' and mounted to the end frame 16' so that the ground post is no longer in electrical continuity with the ground brushes 26' and the rest of the ground conduit. In place of the ground post a ground shoe 50 is mounted upon and electrically connected to the ground brush support plate 40'.

As may be seen in FIG. 3, the end frame 16 according to the exemplary embodiment of the present invention includes a conductive disabling switch 52 interposed between a stub end of the ground post 48' extending through the end frame, shown in phantom in FIG. 3, and the ground shoe 50. A flexible cable 54 is attached to the switch and passes through a cable housing 56 such as steel tubing. The cable extends into the cab area 58 of the truck 60 and terminates in a cable pull 62 conveniently accessible to the vehicle operator as shown in FIG. 4.

Figure 5:
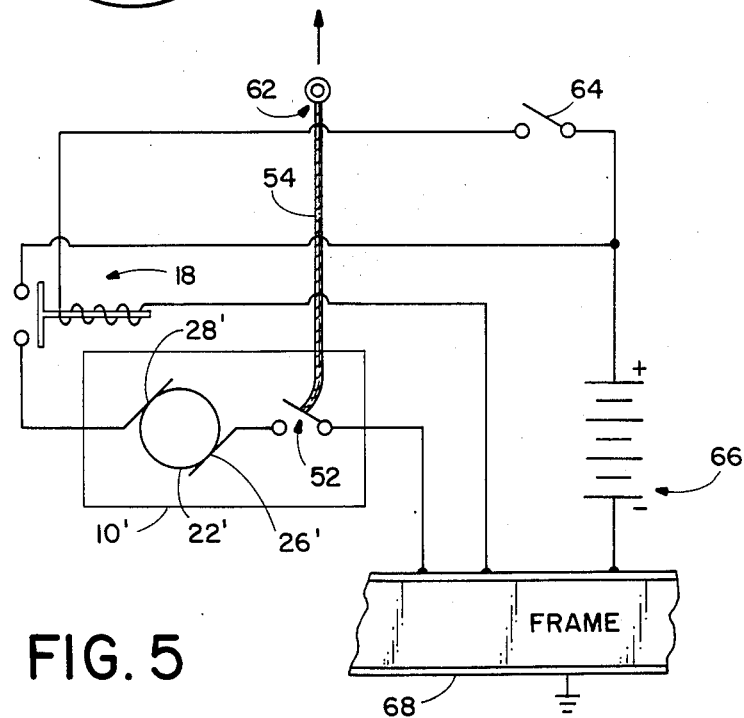
FIG. 5 is a schematic circuit diagram showing the present invention.

Operation of the disabling switch may be readily understood with reference to FIG. 5. When the vehicle operator closes the ignition switch 64, a circuit which includes the solenoid 18 is completed and current is permitted to pass from the battery 66 to ground, here designated as a frame member 68. Current passing through this circuit activates the solenoid 18 to close a second switch within the solenoid completing another circuit which includes the starter motor 10', energizing the hot brushes 28' which are in contact with some of the commutator bars of the commutator 22'. If the disabling switch 52 is closed, the circuit is complete and the starter motor will crank the engine to start the vehicle. If, however, the cable 54 has been pulled, disengaging the disabling switch 52, and interrupting continuity between the commutator and ground, the circuit to ground through the starter motor cannot be completed and the vehicle will not start.

The operation of the disabling switch will be similarly understood with reference to FIGS. 2 and 3. Cable 54 is longitudinally movable within cable housing 56 which is fixed or mounted to the end frame 16'. Pulling upon the cable will move the disabling switch 52, which is electrically and physically interposed between the stub of the ground post 48' and the ground shoe 50 and therefore forms a part of the ground circuit within the starter motor casing, from the position shown in FIG. 3 to the phantom position also shown in FIG. 3, breaking the ground conduit and interrupting electrical continuity between the commutator and the ground post.

Reviewing FIGS. 1 and 2 it will be apparent that when the exemplary starter motor of the present invention is assembled and installed upon a vehicle, its outward appearance is the same as a typical starter motor, except for the cable housing 56 which extends from the end frame 16'. However, when the cable housing is covered with a cloth loom or insulative sheathing, as are most of the wires and hoses of such vehicles to dampen vibration, the cable housing will merely appear to be another wire associated with the starter motor. Accumulation of dirt, grease and grime typical to such an environment will further serve to camouflage the cable housing. It should also be noted that it is important to seal the area where the cable passes through the end frame 16' to prevent water and dirt from entering into the starter motor.

As explained above, it will be very difficult to detect the disabling switch by visual inspection of the starter motor. Furthermore, the cable pull 62 may be disguised in a number of ways and nestled in among the many other controls typical of a large modern truck. For example, it could be positioned as shown in FIG. 4 with the controls for power take-offs or the controls for manual or emergency shut-down.

It will also be very difficult to detect the existence or location of the disabling switch using electrical test equipment since the electrical circuit between the starter motor and the battery or ignition are undisturbed, and so is the electrical circuit between the outside of the starter motor and ground. As a result it is very unlikely an unauthorized and uninformed vehicle operator such as a hijacker, thief, or terrorist will be able to locate and overcome the disabling switch. Even if the unauthorized operator is able to pinpoint the problem as being associated with the starter motor, it will be necessary to remove and replace the starter motor, or alternatively remove and disassemble the starter motor, replace the switch 52 between the stub of the ground post 48' and the ground shoe 50, reassemble the starter motor, and replace it in the vehicle before the vehicle will operate. Hijackers, thiefs or terrorists are unlikely to have the tools, expertise or most importantly, the several hours which will be required for such a repair effort.

As may be inferred from the explanations above, use of the disabling switch does not harm the vehicle, the engine or the starter motor in any fashion. Other methods for disabling a vehicle in an emergency situation usually involve destruction of a vital vehicle part, easy to diagnose for the unauthorized user, and expensive to repair for the vehicle owner. For this reason, interrupting the ground conduit within the starter motor is preferable to interrupting the hot circuit within the starter motor since displacing a portion of the hot circuit could cause an inadvertent short circuit within the starter motor and destroy the starter motor and battery of the vehicle.

The current within a 24 volt truck starter motor can be as much as 1500 amperes. Therefore a solid connection of adequate current carrying capacity is needed to complete the ground circuit. Accordingly, incidental contact caused by the switch 52 merely touching the ground shoe or a portion of the end frame will not sufficiently ground the ground brushes to permit the starter motor to operate.

By looking at FIG. 3 it will be understood that the electrical continuity of the ground conduit could not be restored by merely pushing upon the cable attached to the switch 52. First of all, the calbe is not rigid and it is difficult to control the position of the switch by pushing upon the cable. Secondly, when the exemplary starter motor is assembled, the ground post is adjusted, by means of threads upon the ground port, to tightly squeeze the switch 52 between the stub end of the ground post 48' and the ground shoe 50. Therefore, the switch will not easily slide into position between the ground post and ground shoe. It should be noted that it is preferable to silver plate the stub end of the ground post, the disabling switch and the ground shoe to increase the conductivity of this connection.

It is advisable to take some measures, such as braising a portion of the threads on the ground post, to prevent the disabling switch from being bypassed by screwing the ground post 48' into direct contact with the ground shoe 50 or by a blow to the exposed end of the ground post.

The method and apparatus described herein are not limited to the exemplary embodiment. For example, some starter motors use the starter motor casing itself as the external ground connection point and do not possess a ground post. Nor should the particular location or embodiment of the ground switch limit the invention-interrupting the ground conduit anywhere between the commutator and the external ground connection would be within the scope of this invention. The activation cable is merely an exemplary embodiment, other means such as pneumatic, hydraulic or electrical may be employed to displace or disrupt a portion of the ground conduit within the starter motor casing.

It is possible to practice the invention by modifying existing starters. Indeed, the exemplary embodiment is such a modification. With some types of starters it may be necessary to reform, rearrange, or reorient portions of the end frame assembly or brush holder assembly to obtain the requisite space within the starter motor to modify the starter in a manner shown in the figures.

The terms and expressions which have been employed in the foregoing specification are used therein as terms of description and not of limitation, and there is no intention in the use of such terms and expressions of excluding equivalents of the features shown and described or portions thereof, it being recognized that the scope of the invention is defined and limited only by the claims which follow.

What is claimed is:

1. In a starter motor of the type having a commutator in electrical continuity with a ground connection accessible from the outside of the casing of the starter motor, an apparatus for disabling said starter motor comprising ground conduit means for establishing electrical continuity between said commutator and said ground connection, said ground conduit means including a first portion within said casing, said first portion including displacable means for selectively interrupting the electrical continuity between said commutator and said ground connection, and activation means, operatively associated with said displacable means and operable from outside of said casing for displacing said displacable means and interrupting the electrical continuity between said commutator and said ground connection.

2. The apparatus of claim 1 wherein said activation means extends out of said casing.

3. The apparatus of claim 1 wherein said activation means includes a cable attached to said displacable means within said casing and extending out of said casing.

4. The apparatus of claim 1 wherein said displacable means includes a conductive element physically and electrically interposed in said first portion of said ground conduit.

5. The apparatus of claim 1 wherein said first portion of said ground conduit includes ground brush holders, said displacable means interposed in said first portion of said ground conduit between said ground brush holders and said ground connection.

6. The apparatus of claim 1 wherein said ground conduit includes said casing.

7. The apparatus of claim 1 wherein said ground connection includes said casing.

* * * * *

UNITED STATES PATENT AND TRADEMARK OFFICE
CERTIFICATE OF CORRECTION

PATENT NO. : 4,668,874
DATED : May 26, 1987
INVENTOR(S) : Elmer Cresap

It is certified that error appears in the above-identified patent and that said Letters Patent is hereby corrected as shown below:

Col. 5, Line 27  Change "calbe" to --cable--;

Line 31  Change "port" to --post--;

Line 50  Change "invention-interrupting" to --invention -- interrupting--.

Signed and Sealed this

Fifteenth Day of December, 1987

Attest:

DONALD J. QUIGG

*Attesting Officer*    *Commissioner of Patents and Trademarks*